(12) United States Patent
Lynch (10) Patent No.: US 10,566,166 B1
(45) Date of Patent: Feb. 18, 2020

(54) SQUIRREL GUARD FOR HIGH VOLTAGE INSULATOR COVER

(71) Applicant: Eco Electrical Systems, Reno, NV (US)

(72) Inventor: Michael Lynch, Reno, NV (US)

(73) Assignee: ECO ELECTRICAL SYSTEMS, Reno, NV (US)

( * ) Notice: Subject to any disclaimer, the term of this patent is extended or adjusted under 35 U.S.C. 154(b) by 7 days.

(21) Appl. No.: 16/214,602

(22) Filed: Dec. 10, 2018

(51) Int. Cl.
| | | |
|---|---|---|
| *H01H 85/18* | (2006.01) | |
| *H02B 1/06* | (2006.01) | |
| *H01H 31/00* | (2006.01) | |
| *H01H 31/12* | (2006.01) | |
| *H01H 85/25* | (2006.01) | |
| *H01H 85/00* | (2006.01) | |

(52) U.S. Cl.
CPC ........ *H01H 85/185* (2013.01); *H01H 31/006* (2013.01); *H02B 1/06* (2013.01); *H01H 31/127* (2013.01); *H01H 85/0013* (2013.01); *H01H 85/25* (2013.01)

(58) Field of Classification Search
CPC .............. H01H 31/006; H01H 31/127; H01H 85/0013; H01H 85/0026; H01H 85/175; H01H 85/185; H01H 85/25; H02B 1/06
USPC ....................................................... 337/202
See application file for complete search history.

(56) References Cited

U.S. PATENT DOCUMENTS

| | | | | |
|---|---|---|---|---|
| 2,263,319 A | * | 11/1941 | Treanor ................. | H01B 17/26 174/139 |
| 3,766,310 A | * | 10/1973 | Paschen ............... | H01R 13/516 174/138 F |
| 7,154,034 B2 | | 12/2006 | Lynch | |
| 9,787,071 B1 | * | 10/2017 | Rauckman ............. | H02G 3/081 |
| 9,916,956 B1 | * | 3/2018 | Rauckman ............. | H01H 85/25 |
| 2006/0162953 A1 | * | 7/2006 | Hiller ..................... | H01B 17/00 174/138 F |
| 2008/0128163 A1 | * | 6/2008 | Bradford ............... | H01B 17/00 174/5 R |
| 2016/0013004 A1 | * | 1/2016 | Kester ............... | H01H 85/2045 337/202 |
| 2016/0133360 A1 | * | 5/2016 | Lenk ....................... | H01F 27/02 361/40 |

OTHER PUBLICATIONS

Reliaguard, "Hot Stickable Universal Cut-Out Guard (CO-10007)", ReliaGuard product catalog, 2018.

* cited by examiner

*Primary Examiner* — Jacob R Crum (74) *Attorney, Agent, or Firm* — Patent Law Group; Brian D. Ogonowsky (57) ABSTRACT

For protecting wildlife from high voltage conductors proximate to a utility pole, dielectric covers are used to cover fuse cutouts, bushings, solid-blade disconnects, lightning arrestors, or other connections to insulators. Such covers include a vertical slot for receiving an energized wire so the cover can be installed using a hot-stick while the wire is energized. The vertical slot substantially faces the utility pole. To prevent squirrels storing nuts in the cover via the vertical slot, a squirrel guard is fitted over the top of the cover to block access to the vertical slot in the cover. The guard has a second vertical slot for receiving the wire so can be installed while the wire is energized. The guard may be customized for the particular cover used with it. Retaining pins secure the guard and cover in place.

20 Claims, 10 Drawing Sheets

SQUIRREL GUARD FOR HIGH VOLTAGE INSULATOR COVER

FIELD OF THE INVENTION

The invention relates to an augmentation to a wildlife-protection cover for a high voltage conductor, such as a cover for a fuse cutout or a bushing, and, in particular, to a squirrel guard that fits over the cover and prevents squirrels from storing nuts in the cover.

BACKGROUND

Applicant's own U.S. Pat. No. 7,154,034, incorporated herein by reference, describes a dielectric fuse cutout cover. The cover protects birds and other animals from electrocution, which may also trigger an over-current condition due to electrical shorts between phases or phase to ground that may cause a power outage.

Figure 1:
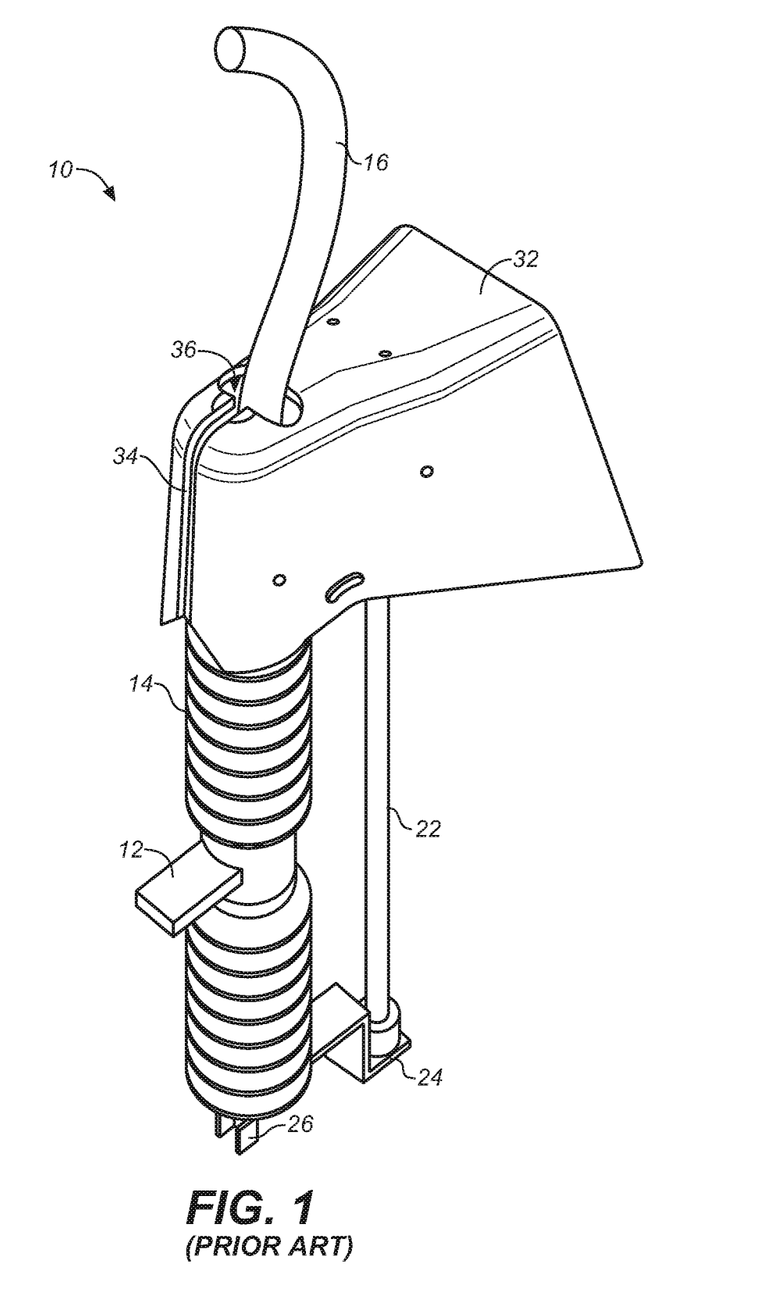
FIG. 1 is a perspective view of a fuse cutout with a prior art cover, disclosed in Applicant's U.S. Pat. No. 7,154,034.
Figure 2:
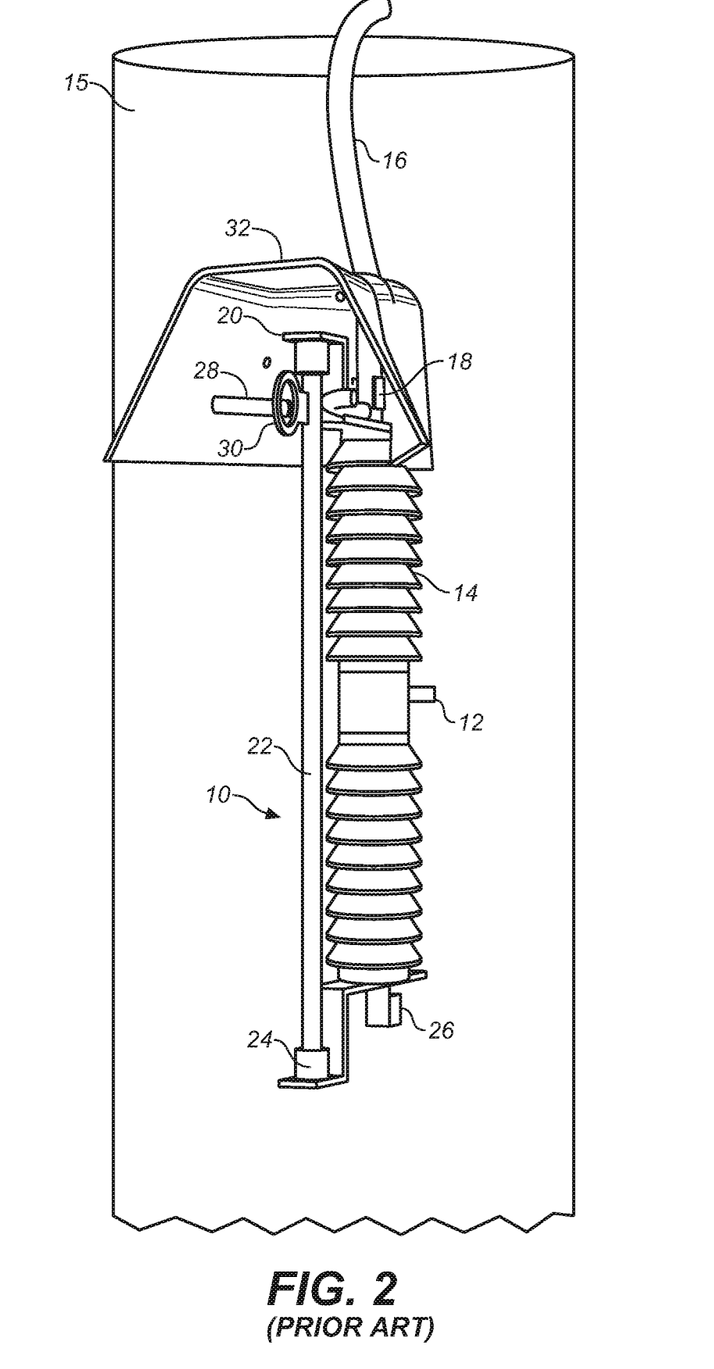
FIG. 2 is a different perspective view of the structure of FIG. 1 connected to a utility pole.

FIGS. 1 and 2 are reproduced from U.S. Pat. No. 7,154,034 and are used to illustrate a problem that has been reported by linemen in the field using the cover and other types of covers incorporating a vertical slot for a wire.

FIGS. 1 and 2 illustrate a conventional fuse cutout 10. A mounting bracket 12 secures a ceramic or polymer insulator 14 to a wooden utility pole 15 or crossarm used to support high voltage conductors, such as carrying 3-phase 12KVAC or higher. A "hot" wire 16 is attached to one phase. The wire 16 is substantially vertical and typically tapped off an overhead wire running between utility poles. A metal connector 18 electrically connects the wire 16 to a top contact 20 of a blowable fuse 22. The fuse 22 electrically connects to a pivot joint 24 and a bottom connector 26. The bottom connector 26 is connected to another wire (not shown) which may lead to a transformer or any other electrical device or conductor. Opening or blowing of the fuse 22 disconnects the top contact 20 from the bottom connector 26.

A metal hook assembly 28 is fixed to the connector 18 and is used to temporarily support a load break tool for opening the fuse 22. A metal pull ring 30 is physically and electrically connected to the upper end of the fuse 22. By coupling the load break tool to the hook assembly 28 and pull ring 30 and then pulling down on the load break tool, the fuse 22 may be pulled away to safely open the circuit.

A dielectric cover 32, described in Applicant's U.S. Pat. No. 7,154,034, can be installed by a lineman, using a hot-stick, while the wire 16 is connected and energized, since the cover 32 has a rear vertical slot 34 and top hole 36 for the wire 16 that allows the cover 32 to be slid over the cutout 10 and lowered down onto the cutout 10. The cover 32 prevents wildlife, such as birds and squirrels, from coming into contact with the high voltage conducting portions of the cutout 10.

The slot 34 faces the pole 15 or crossarm so the wildlife may be able to access the narrow slot 34 while alighting on the pole or crossarm. The large opening shrouding the hook assembly 28 and pull ring 30 face away from the pole 15 or crossarm and cannot be accessed by the wildlife. So the wildlife is protected.

However, linemen have reported that squirrels are able to push nuts, such as acorns, through the resilient rear slot 34 to fill the area near the wire 16 with the nuts. On the order of 100 nuts have been crammed into the cover 32 by squirrels via the slot 34. This also results in the resilient slot 34 being greatly widened by the nuts. This reduces the ability of the cover 32 to protect the wildlife and reduces the ability of the cover 32 to prevent arcing from a conductor to the grounded pole 15 or crossarm.

Figure 3:
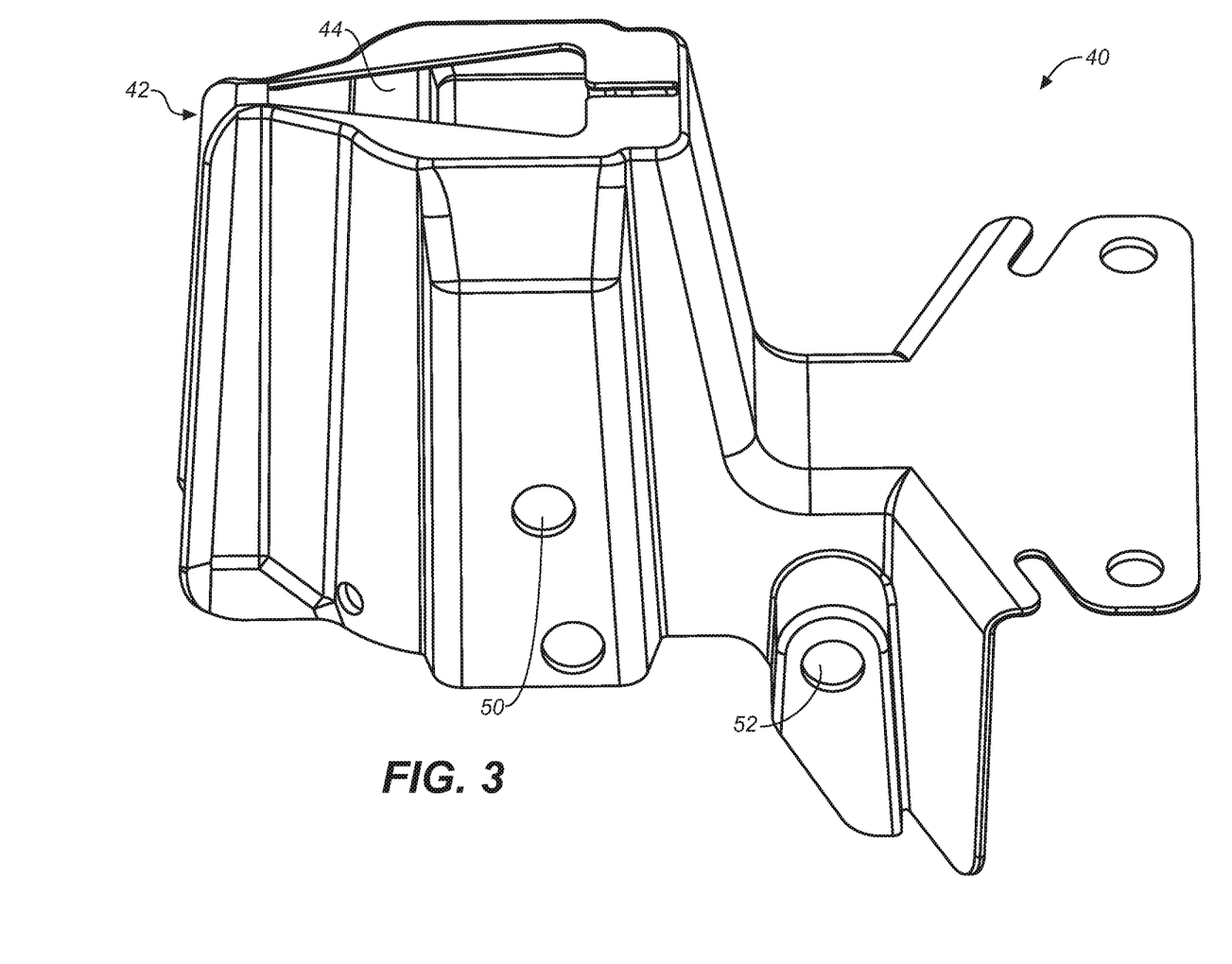
FIG. 3 is a perspective view of another type of cutout cover designed by the Applicant, where there are no sidewalls near the end of the cover, and the roof over the hook assembly and pull ring is flat, so that the hook assembly and pull ring of the cutout may be accessed through a wide range of angles by a load break tool.
Figure 4:
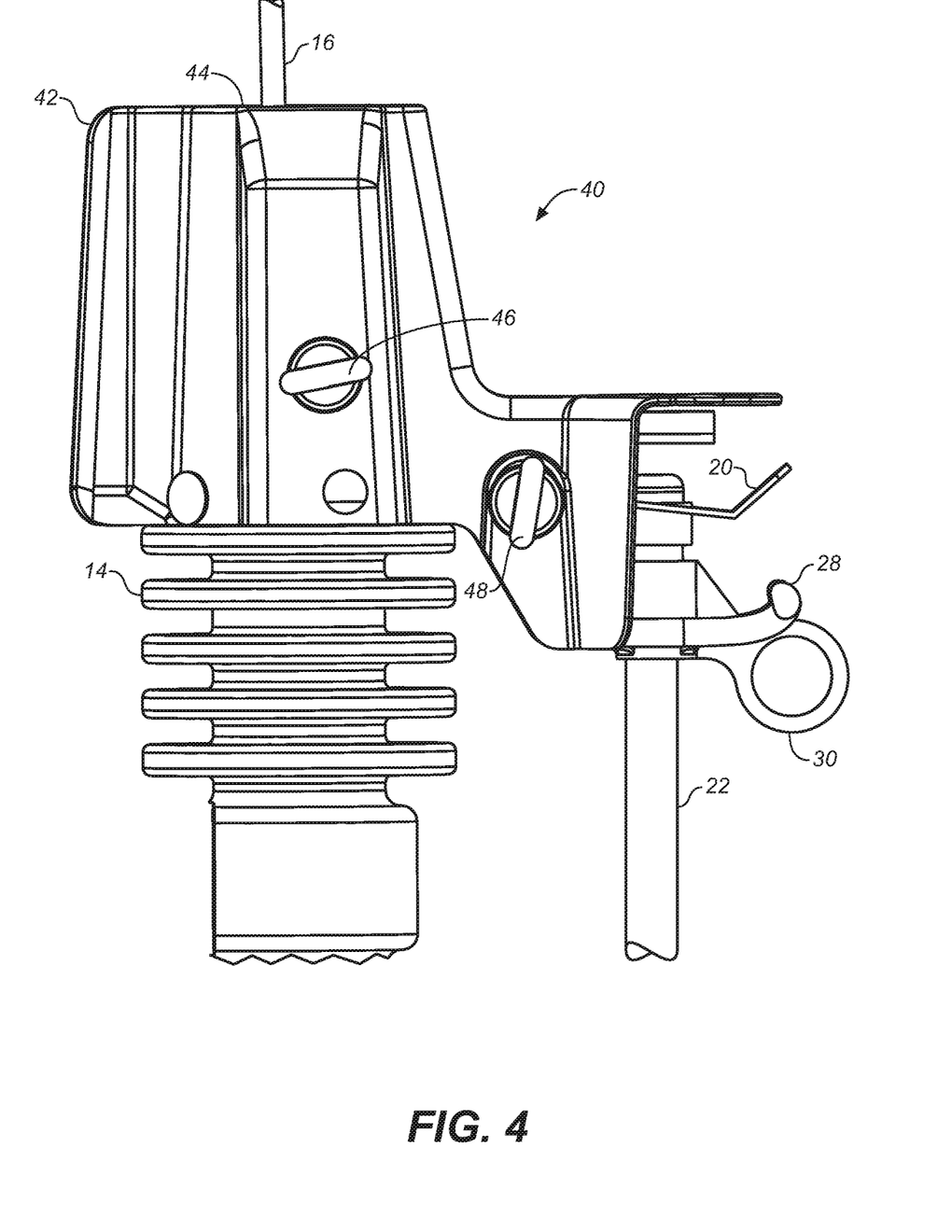
FIG. 4 is a side view of the cutout of FIGS. 1 and 2 with the cutout cover of FIG. 3 installed over it.

FIGS. 3 and 4 illustrate an alternative cutout cover 40, also invented by the Applicant. There are no sidewalls near the end of the cover 40, and the roof over the hook assembly and pull ring is flat, so that the hook assembly and pull ring of the cutout may be accessed through a wide range of angles by a load break tool. The cover 40 is formed of a resilient dielectric. The cover 40 is similar to the cover 32 in that it has a vertical slot 42 in back and a top hole for the wire 16 (FIG. 1) so the cover 40 can be slid over the cutout while the wire 16 is connected and energized. Since the slot 42 is resilient and faces the pole 15 or crossarm, squirrels can easily push nuts through the slot 42 to pack the cover 40 with nuts.

FIG. 4 shows the cover 40 installed over a cutout 10.

After the cover 40 is in position, pins 46 and 48 are pushed through holes 50 and 52 (FIG. 3) to keep the cover 40 in place during high wind conditions. The pins 46 and 48 extend under the cutout connector 18 and top contact 20.

Figure 5:
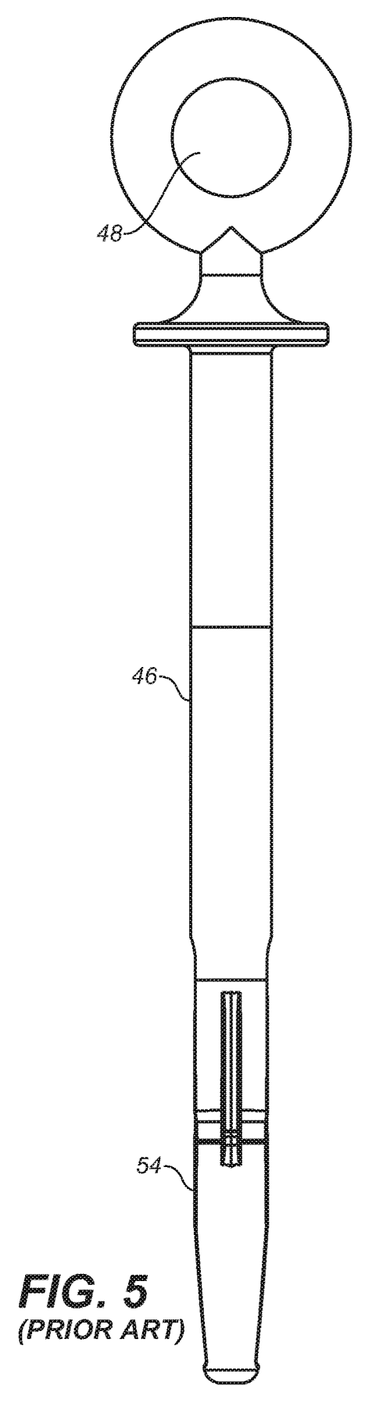
FIG. 5 is a front view and FIG. 6 is a side view of a pin used to secure the cover over the cutout.
Figure 6:
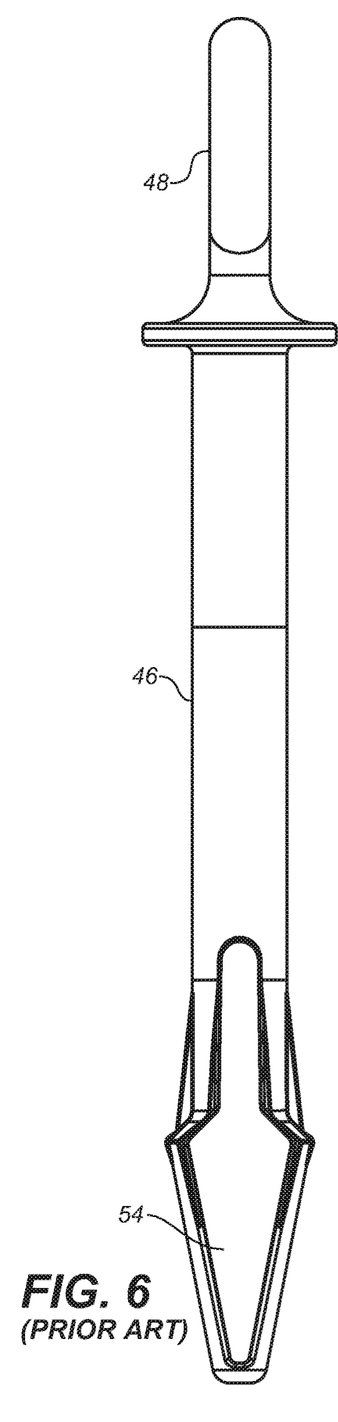

FIGS. 5 and 6 illustrate front and side views of the plastic pin 46. The pin 46 has a ring 48 for grabbing with a hot-stick. A resilient tip 54 enables the pin 46 to be easily pushed through the hole 50 (FIG. 3), but makes it more difficult to be removed due to its differently sloped sides.

Other types of dielectric covers are installed over high voltage bushings and insulators to prevent wildlife contacting any high voltage conductors. One such cover covers the high voltage coupling between a wire and an insulator, where the wire conducts electricity to a transformer. Such covers may also have the rear vertical slot and hole to enable the cover to be installed while the wire is connected and energized. Such covers also have the problem with squirrels cramming nuts through the resilient slot, since the slot faces the utility pole.

What is needed is a device that can be easily installed over existing installed covers to prevent squirrels cramming nuts through the resilient rear vertical slot. Such a device should also be able to be packaged with the covers using the existing packaging.

SUMMARY

A squirrel guard is disclosed that simply slides down over an existing dielectric cover, such as a bushing cover, a fuse cutout cover, a solid-blade disconnect cover, a lightning arrestor cover, or other insulating covers, to block squirrels or other animals from the vertical wire slot in the cover. The squirrel guard may be a single molded plastic piece for easy manipulation by a lineman using a hot-stick. The size of the squirrel guard is slightly larger than the cover it is designed for, so there is little play in the squirrel guard after it is installed over the cover.

A different squirrel guard may be designed for each type of commercially available cover so the mating and sizing is appropriate.

The squirrel guard has a front vertical slot, through which the wire passes, and a top hole that aligns with the top hole of the existing cover. The vertical slot in the squirrel guard faces away from the utility pole. The back of the squirrel guard (facing the pole) is closed and covers the rear vertical slot in the bushing cover or cutout cover. Therefore, there is no access to the cover's rear vertical slot by squirrels or other animals.

The squirrel guard may be semi-rigid or resilient. If the cover and squirrel guard are resilient, the respective slots may resiliently close after the wire is pushed through the slots.

If the existing cover uses through-holes for pins, the squirrel guard also has through-holes that align with the through-holes in the cover. The retaining pins may be temporarily removed from the cover, using a hot-stick, and reinserted through the aligned holes in the cover and squirrel guard.

Other features of the squirrel guard are also described.

BRIEF DESCRIPTION OF THE DRAWINGS

Elements labeled with the same numerals in the various figures may be identical or similar.

DETAILED DESCRIPTION

FIGS. 7-10 illustrate an embodiment of a dielectric squirrel guard 60 that fits over the cutout cover 40, previously described. Similar squirrel guards would be customized to fit over any commercially available cutout cover, or bushing cover, or lightning arrestor cover, or insulator cover.

Figure 7:
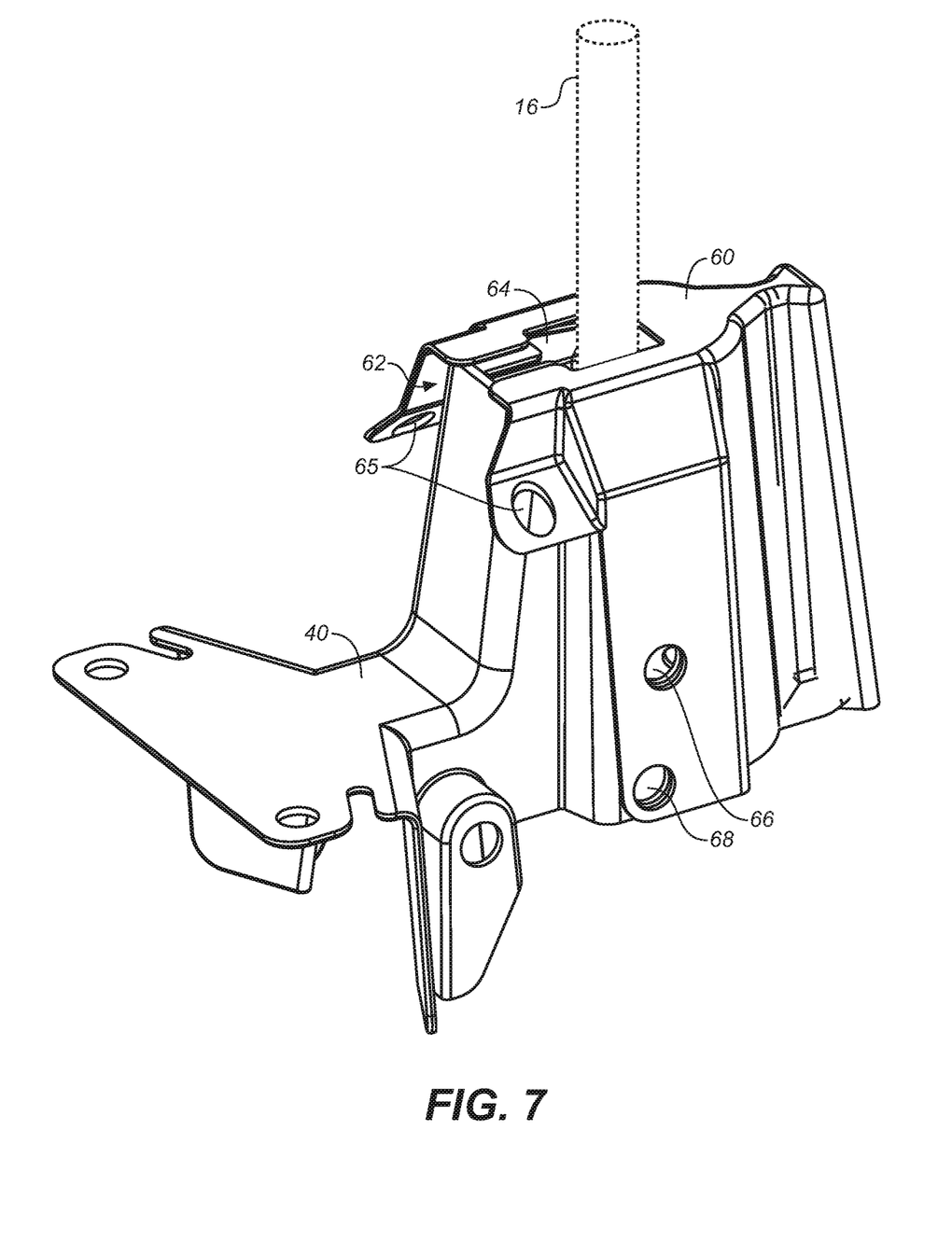
FIG. 7 is a perspective view of one embodiment of a squirrel guard installed over the cover of FIG. 3 or 4. The squirrel guard is customized for each commercially available cover.

FIG. 7 shows the squirrel guard 60 securely positioned over the cover 40. The lineman would first position the cover 40 over the cutout by pushing the wire 16 (FIG. 4) through the vertical slot 42 (FIG. 3), as shown in FIG. 4. The lineman then installs the squirrel guard 60 over the cover 40 by pushing the wire 16 through the vertical slot 62 of the squirrel guard 60 and positioning the squirrel guard 60 over the cover 40. The wire 16 then extends through the hole 64 in the top of the squirrel guard 60. The lineman may use a hotstick by grasping the squirrel guard 60 by either of the holes 65.

Through-holes 66 and 68 extend through the squirrel guard 60 and align with through-holes in the cover 40. One or more retaining pins 46 (FIG. 5) are then pushed through one or both of the holes 66 and 68 to secure the squirrel guard 60 in place, as well as to secure the cover 40 in place over the cutout, as shown in FIG. 4.

Figure 8:
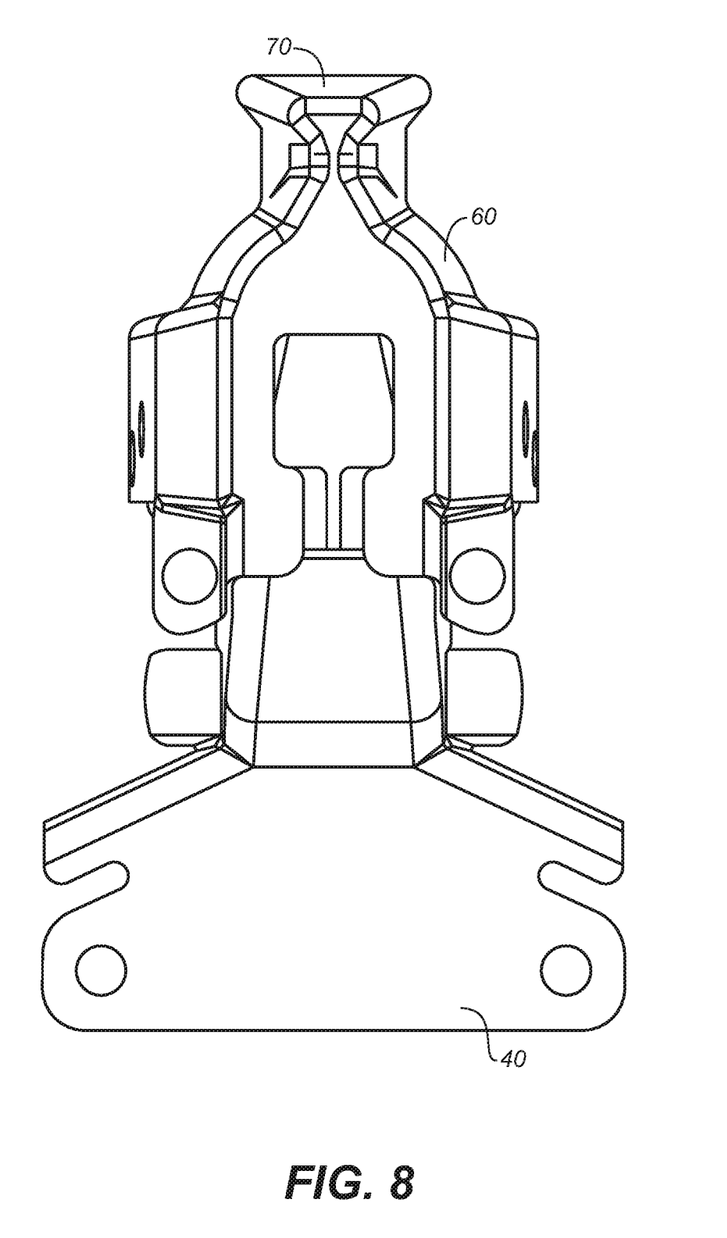
FIG. 8 is a top down view of the structure of FIG. 7.

FIG. 8 is a top down view showing how the back 70 of the squirrel guard 60 is solid to block the vertical slot 42 (FIG. 3) of the cover 40. Therefore, there is no access for a squirrel to store nuts in the cover 40 via the slot 42.

Figure 9:
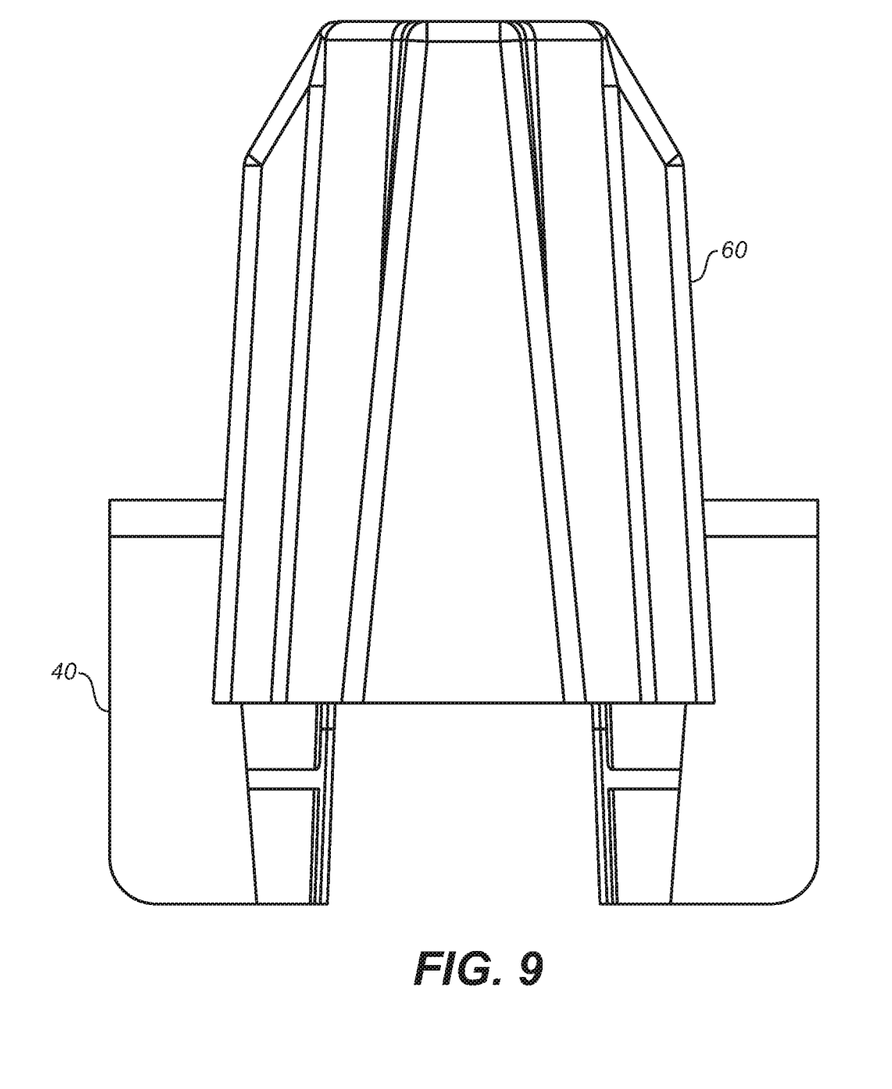
FIG. 9 is a back view of the structure of FIG. 7, showing the squirrel guard blocking access to the vertical slot in the cover.

FIG. 9 is a back view of the structure, which faces the utility pole.

In the embodiments, the squirrel guard 60 extends from the top of the cover 40 to the bottom of the cover 40, but it can extend down any length of the cover 40 as long as the vertical slot in the cover is suitably blocked.

Figure 10:
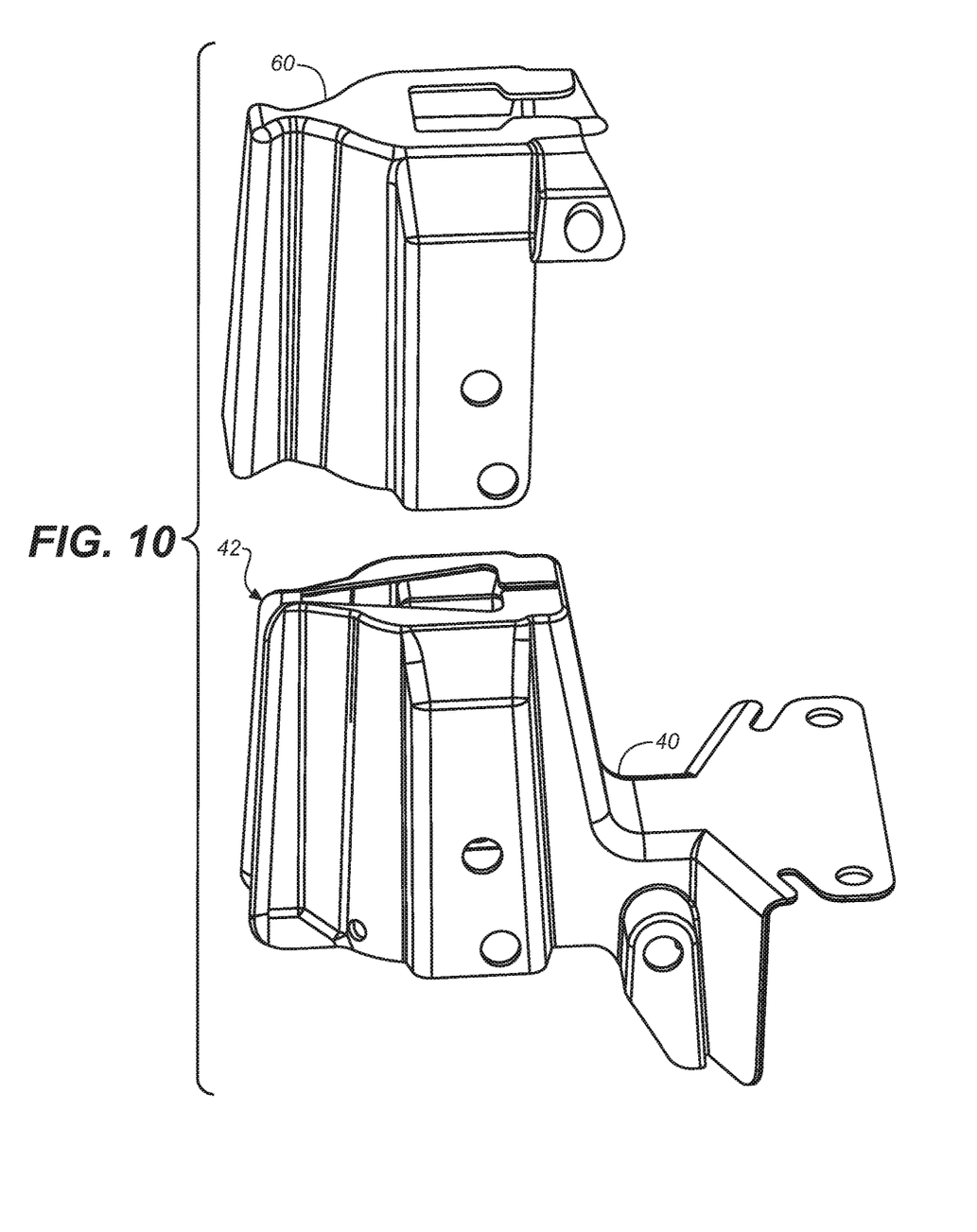
FIG. 10 illustrates the squirrel guard of FIG. 7 being installed over the cover of FIG. 3.

FIG. 10 illustrates the squirrel guard 60 in position for being lowered onto the cover 40.

Figure 11:
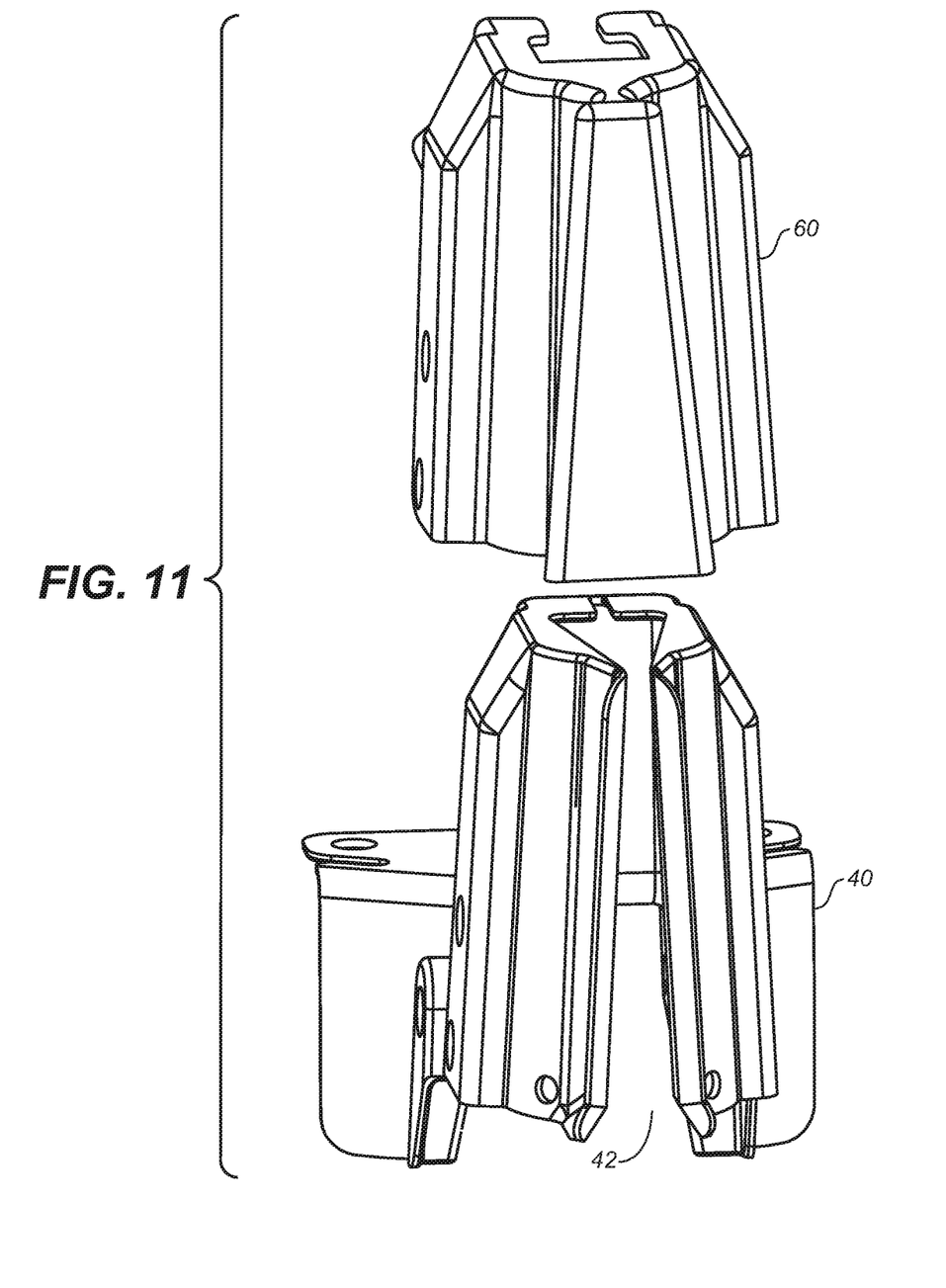
FIG. 11 is a back view of the squirrel guard of FIG. 7 being installed over the cover of FIG. 3, better showing how the squirrel guard blocks access to the vertical slot in the cover.

FIG. 11 is a back view of the squirrel guard 60 in position for being lowered onto the cover 40, better showing how the squirrel guard 60 blocks the vertical slot 42 in the cover 40.

The squirrel guard can have a wide variety of designs since each is customized to fit over a commercially available cover, where the cover has a vertical slot for receiving a wire so that the cover can be installed while an energized wire is connected to the insulator. The important aspect of the squirrel guard is to block access to the vertical slot in the cover, which typically faces the utility pole. Different models of cutout covers, bushing covers, lightning arrester covers, etc. may require different techniques to secure the squirrel guard over the cover. The squirrel guard may be considered a cap that fits over any cover having a slot for a wire to pass through.

Since the squirrel guard may fit tightly over the cover, there may be no need for additionally securing the squirrel guard onto the cover.

Although embodiments have been shown where the front vertical slot in the squirrel guard is located opposite to the rear vertical slot in the cover, the vertical slot in the squirrel guard may be located on the side of the guard so the guard is slid laterally into position over the cover.

Since the squirrel guard fits closely over the cover, and takes up very little space, existing packaging for the cover may also accommodate the squirrel guard, so they can be sold together.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A wildlife protection system for a high voltage power system comprising:
    a dielectric guard having a first top slot for receiving a wire and having a first top opening for the wire; and
    a cover, separate from the guard, the cover having a vertical slot for receiving the wire and a second top opening for the wire,
    wherein the guard is configured to slide over the vertical slot to block the vertical slot while the first top opening and the second top opening align so that the wire extends through both the first top opening and the second top opening when the guard is installed on the cover.

2. The system of claim 1 wherein the guard is configured to slide down over the vertical slot after the cover has been installed over the wire.

3. The system of claim 1 wherein the guard is customized for the particular cover used with it.

4. The system of claim 1 wherein the cover is a fuse cutout cover.

5. The system of claim 1 wherein the cover covers a portion of an insulator.

6. The system of claim 1 wherein the cover is a bushing cover.

7. The system of claim 1 wherein sidewalls of the guard extend down to a bottom of the cover.

8. The system of claim 1 wherein the guard includes one or more first holes in it for receiving one or more retaining pins.

9. The system of claim 8 wherein the one or more first holes align with one or more second holes in the cover for receiving the one or more retaining pins.

10. The system of claim 1 wherein the first top opening and the second top opening align with each other.

11. The system of claim 1 wherein the cover is positioned to cover at least a top of an insulator supported by a utility pole or a crossarm so that the vertical slot is substantially facing the utility pole or crossarm.

12. The system of claim 1 wherein the guard and the cover are packaged in the same package while the guard is fitted over the cover.

13. A method for using a wildlife protection system for a high voltage power system comprising:
   providing a dielectric guard having a top slot for receiving a wire and having a first top opening for the wire; and
   fitting the guard over a separate cover, the cover having a vertical slot for receiving ft the wire and a second top opening for the wire,
   wherein the guard overlies the vertical slot when fitted over the cover to block the vertical slot while the first top opening and the second top opening align so that the wire extends through both the first top opening and the second top opening when the guard is installed on the cover.

14. The method of claim 13 wherein the guard is larger than the cover to fit over the cover.

15. The method of claim 13 wherein the guard is customized for the particular cover used with it.

16. The method of claim 13 wherein the cover is a fuse cutout cover.

17. The method of claim 13 wherein the cover covers a portion of an insulator.

18. The method of claim 13 wherein the cover is a bushing cover.

19. The method of claim 13 wherein the guard includes one or more first holes in it for receiving one or more retaining pins, the method further comprising pushing one or more retaining pins through the one or more first holes to secure the guard in place over the cover.

20. The method of claim 19 wherein the one or more first holes align with one or more second holes in the cover for receiving the one or more retaining pins.

* * * * *

UNITED STATES PATENT AND TRADEMARK OFFICE
CERTIFICATE OF CORRECTION

PATENT NO.        : 10,566,166 B1
APPLICATION NO.   : 16/214602
DATED             : February 18, 2020
INVENTOR(S)       : Michael Lynch Page 1 of 1

It is certified that error appears in the above-identified patent and that said Letters Patent is hereby corrected as shown below:

In the Claims

Column 6
Line 2, Claim 13, where "vertical slot for receiving ft the wire" should be --vertical slot for receiving the wire--.

Signed and Sealed this
Seventh Day of April, 2020

Andrei Iancu
*Director of the United States Patent and Trademark Office*